T. M. HUGHES.
CULTIVATOR.
APPLICATION FILED AUG. 25, 1920.
1,414,880.   Patented May 2, 1922.
5 SHEETS—SHEET 2.
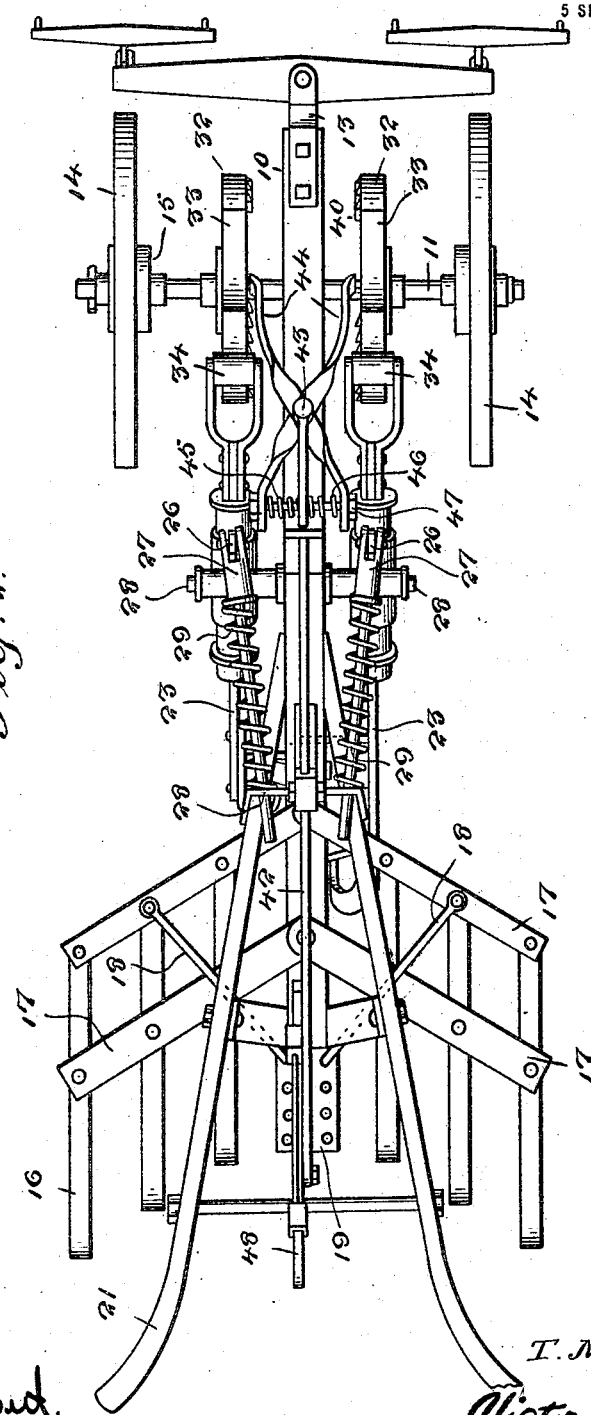

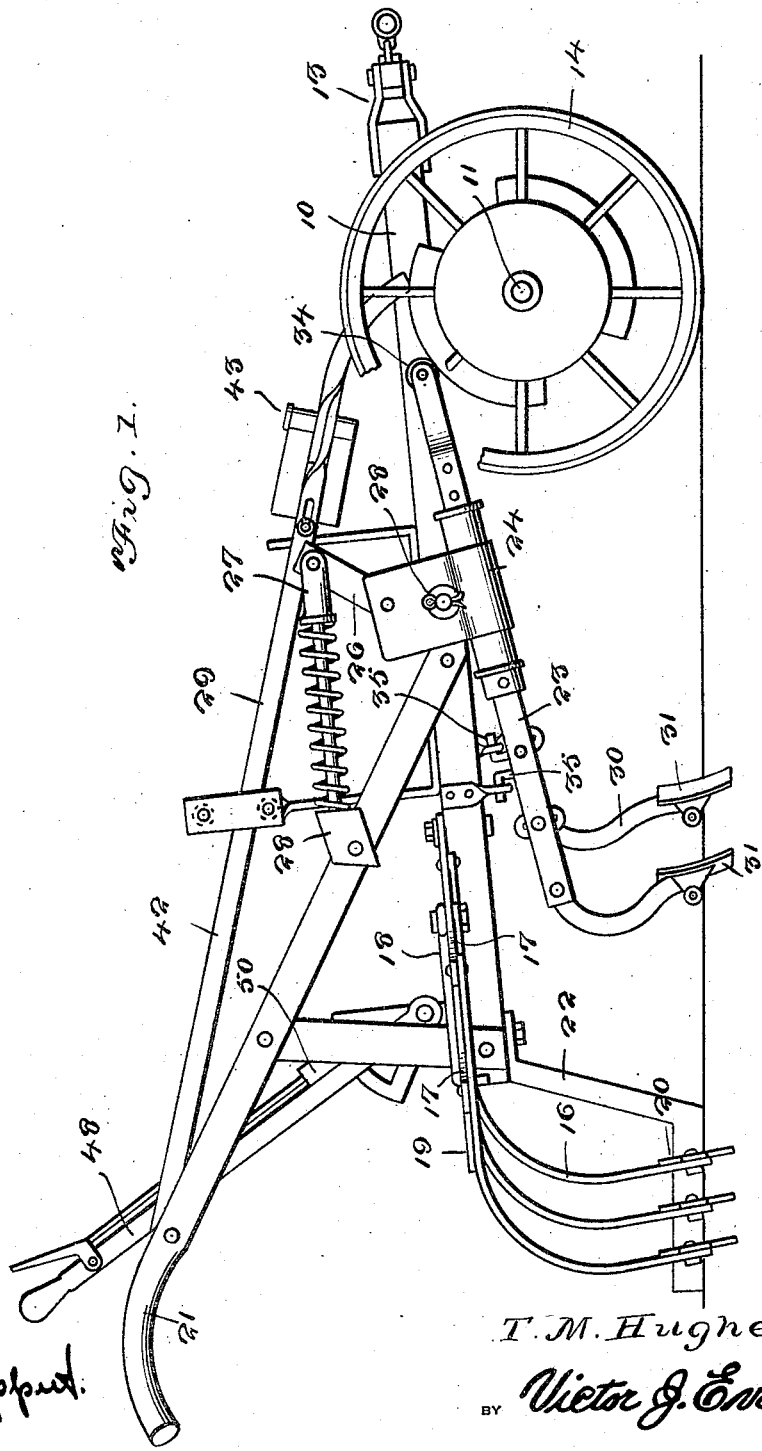

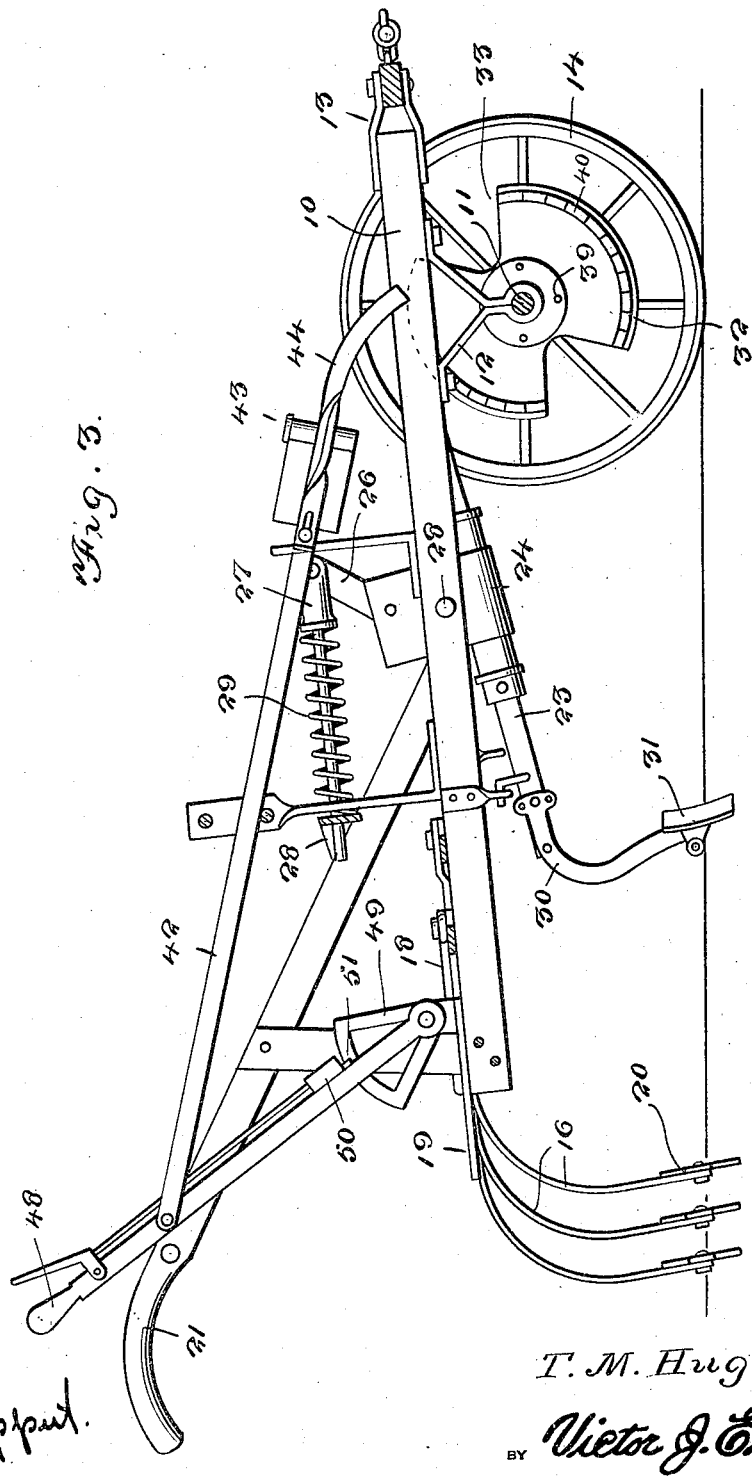

T. M. HUGHES.
CULTIVATOR.
APPLICATION FILED AUG. 25, 1920.
1,414,880.
Patented May 2, 1922.
5 SHEETS—SHEET 4.
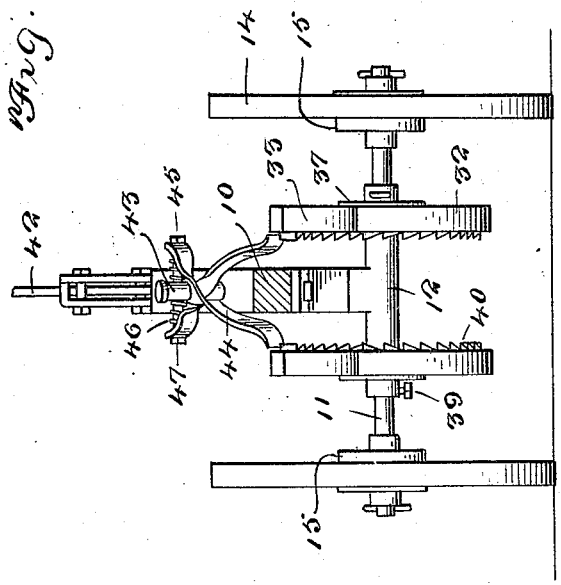
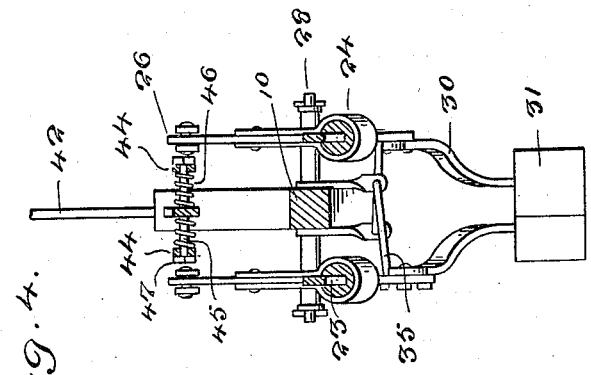
T. M. Hughes
INVENTOR
BY Victor J. Evans
ATTORNEY
WITNESS:
E. R. Ruppert.

T. M. HUGHES.
CULTIVATOR.
APPLICATION FILED AUG. 25, 1920.
1,414,880.
Patented May 2, 1922.
5 SHEETS—SHEET 5.
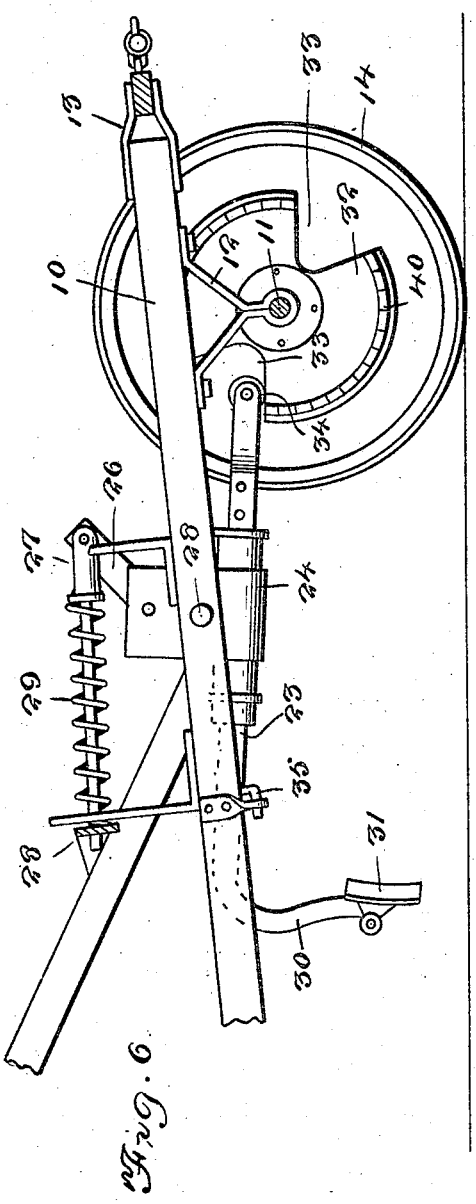
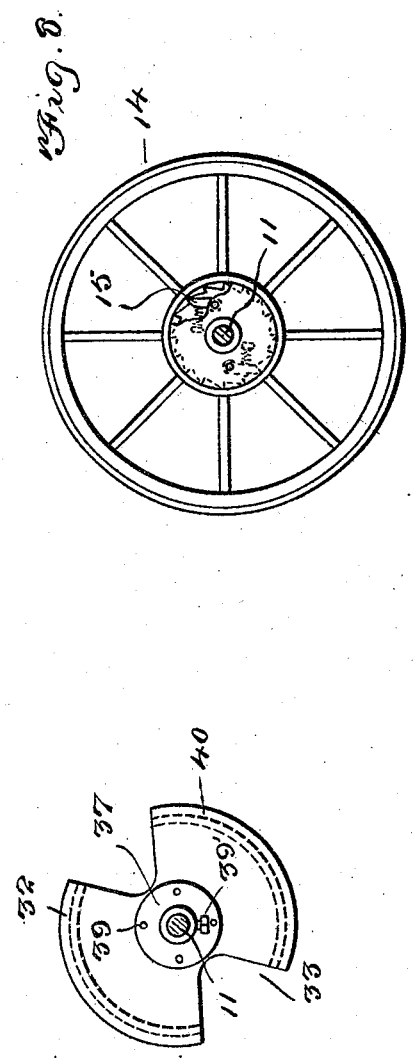
T. M. Hughes
INVENTOR
BY Victor J. Evans
ATTORNEY
WITNESS:

ated May 2, 1922.

UNITED STATES PATENT OFFICE.

THOMAS M. HUGHES, OF CARLISLE, MISSISSIPPI.

CULTIVATOR.

1,414,880.

Specification of Letters Patent. Patented May 2, 1922.

Application filed August 25, 1920. Serial No. 405,795.

*To all whom it may concern:*

Be it known that I, THOMAS M. HUGHES, a citizen of the United States, residing at Carlisle, in the county of Claiborne and State of Mississippi, have invented new and useful Improvements in Cultivators, of which the following is a specification.

This invention relates to improvements in agricultural machines and has for an object the provision of a machine which is capable of cultivating around all sides of a plant when travelling along a row without danger of injury to the plants.

Another object is the provision of a cultivator, which in addition to performing the work of an ordinary cultivator, upon each side of a row of plants, will hoe or cultivate between the plants so that the entire surface upon all sides of the plant will be thoroughly broken up.

Another object is the provision of a cultivator which may be drawn by a pair of horses to straddle a row of plants, will space the plants, hoe the drill clean and work the entire row at one operation, that is, by a single passage down the row. The cultivator is especially useful in growing cotton, which is drilled in a row, as the machine will cut away the plants at intervals and properly space the plants remaining, the spacing being capable of regulation as desired. It may also be used in the cultivation of crops which are planted at spaced intervals along a row, as the hoe may be regulated to operate at the proper time to cultivate only the spaces between the plants.

Another object is the provision of a cultivator which includes a plurality of movable hoes or shovels, adapted to enter the ground at intervals, means being provided whereby these intervals may be varied to adjust the cultivator to various conditions.

Other objects and advantages of the invention will appear as the following description is read in connection with the accompanying drawings.

In the drawings:—

Figure 1 is a side elevation of the cultivator showing the hoes in normal or lowered position.

Figure 2 is a plan view of the same.

Figure 3 is a central longitudinal sectional view.

Figure 4 is a transverse section taken on the line with the pivotal mounting of the hoes.

Figure 5 is a similar view taken on the line with the drive shaft or axle.

Figure 6 is a detail view showing one of the hoes in raised position.

Figure 7 is a similar view of one of the cam disks.

Figure 8 is a sectional view showing the ratchet mechanism for locking the traction wheels to the axle.

Referring to the drawings in detail, wherein like characters of reference denote corresponding parts, the machine comprises a main cultivator beam 10 which is supported at its forward end by an axle 11, mounted for rotation in a bearing 12. The beam is also provided with a suitable clevis 13 for the attachment of draft animals, the machine being designed to straddle the row to be cultivated with an animal upon either side of the row. Mounted upon each end of the axle 11 is a combined supporting and traction wheel 14. These wheels are capable of rotation upon the axle when the machine is moved rearward, but when moving in a forward direction, the wheels are locked to the axle by ratchet mechanism 15 which includes internal ratchet teeth carried by the wheel hubs and spring actuated dogs carried by the axle.

Mounted upon the rear end of the main cultivator beam 10 are spring cultivator arms 16, the said arms being pivotally secured to parallel bars 17 disposed upon each side of the beam and having their inner ends pivotally connected to said beam. By this means the cultivator arms upon each side of the beam may be independently adjusted for depth and held in adjusted position by means of a hook shaped rod 18, which has one end pivotally secured to one of the parallel bars 17 and its opposite end engaged in any one of a number of perforations provided in a plate 19 which extends rearwardly from the main cultivator beam. The lower end of the spring cultivator arms 16 are provided with teeth 20 which are pivotally connected to the said arms so that they may be rotated to present either pointed end for entrance into the ground. The main cultivator beam 10 is further provided with handles 21 which are suitably secured and braced to the beam.

By means of the cultivator teeth just described, the plants may be cultivated longitudinally upon each side of the row and in order to protect the young plants and prevent them from being covered by the earth, there is secured to the beam 10 spaced runners or fenders 22 which are disposed longitudinally of the beam beneath the latter and pass along either side of the row. These fenders are detachably connected to the beam to permit of their removal when desired.

One of the particular points of novelty of the invention resides in the provision of means for cultivating the plants in front of and behind the latter in the direction of travel of the machine without injury to the plants. For this purpose there is provided upon each side of the main cultivator beam a hoe beam 23. This last mentioned beam is mounted in a cylindrical bearing 24 and is capable of rotation therein, while the bearing is mounted for pivotal movement upon a stub shaft 28 which projects laterally from the side of the beam 10. Connected to each of the cylindrical bearings 24 is an arm 26, while pivotally connected to this arm is one end of a rod 27. The other end of this rod is mounted for sliding movement in a bearing provided in a cross bar 28 which extends transversely of the handles 21. Surrounding each of the rods 28 and interposed between a shoulder in front of said rods and the cross bar 28 is a coiled spring 29 which acts to force the rod outwardly or in a direction toward the front end of the machine.

The rear end of the hoe beam 23 has pivotally and adjustably connected thereto an arm 30, whose lower end carries a hoe or shovel blade 31. This hoe or shovel blade is removably secured to the arm 30 so as to permit of the use of a blade which is adapted for the work being performed. By adjusting the arms 30 upon their pivots, the blades 31 will enter the soil to a greater or less extent and thus provide for either shallow or deep cultivation.

Removably secured upon the axle 11 upon opposite sides of the main cultivator beam 10 is a cam 32, the latter being in the form of a disk and being provided with one or more notches or depressions 33 around its periphery, while the forward ends of the hoe beams 23 are provided with rollers 34 which travel over the peripheries of the cams 32 and are adapted to enter the depressions 33 under the action of the springs 29, whereupon the hoe blades 31 will be raised out of engagement with the ground. By this means the hoe beams are rocked upon their pivots and the blades 31 alternately raised and lowered. One of the hoe beams 23 is longer than the other so as to position one blade 31 in advance of the other. This provides for cultivating the area between the plants at both the front and rear thereof in the direction of travel of the machine. The beams 23 are arranged as stated upon opposite sides of the main cultivator beam 10 and in order to bring the shovels in position beneath the main cultivator beam and in a line with the plants being cultivated, the said beams 23 are each provided with an inwardly extending arm 35, whose inner ends are pivotally connected to the main cultivator beam, so that as the shovels are lowered due to the rollers 34 leaving the depressions 33 in the cams, the hoe beams 23 will be rotated within the cylindrical bearings through the pivotal connection of the arms 35 and thus move the blades inward beneath the main cultivator beam 10. As the rollers 34 enter the depressions 33 of the cams, this movement will be reversed, that is, the shovels will rise and move laterally outward so as to prevent injury to the plants.

For the purpose of removably securing the cams 32 upon the axle 11, the said cams are provided with a slot 36 which engages over the axle, while mounted fast upon the axle are spaced collars 37. These collars are provided with openings which register with similar openings in the cams 32 to permit of the passage of suitable fastening devices 39. The collars 37 of one of the cams, for example, the cam upon the right of the main cultivator beam are secured upon the axle 11 through the medium of set screws 39' so that the depression in the cams 32 may be relatively adjusted and the hoes operated at relatively different times.

In order to properly regulate the machine so that the hoes will operate at the proper point without injury to the plants, each of the cams 32 are provided upon their opposed faces with ratchet teeth 40, the latter being preferably arranged within the plane of the face of the disks. Mounted for sliding movement in bearings 41 carried by the main cultivator beam 10 is a rod 42. One end of this rod has pivotally secured thereto as indicated at 43, arms 44. The outer ends of these arms provide dogs for engagement with the ratchet teeth 40, while their inner ends are connected by a threaded rod 45 which passes through the rod 42 and the ends of the arms 44. Positioned upon this rod 45 and upon opposite sides of the rod 42 are springs 46 which serve to force the ends of the arms apart and into yielding engagement with the ratchet teeth 40. An adjusting nut 47 positioned upon each end of the rod 45 serving to limit the outward movement of the arms 44. The opposite end of the rod 42 has pivotally secured thereto an operating lever 48 which is mounted for pivotal movement upon a bracket 49 carried by the main cultivator beam 10. The lever 48 carries a spring actuated dog 50 which engages a notch 51 in the bracket 49.

By moving the lever 48 backward and forward upon its pivot, the positions of the cams 32 may be adjusted so as to properly position the hoes with respect to the plants. By this means the hoes may be caused to enter the soil at the same point when the cultivation of the row is repeated. To regulate the space between the intervals of operation of the hoes, other disks or cams 32 may be substituted so that the hoes will engage the ground at more or less frequent intervals.

The invention is susceptible of various changes in its form, proportions and minor details of construction and the right is herein reserved to make such changes as properly fall within the scope of the appended claims.

Having described the invention what is claimed is:—

1. A cultivator embodying a wheel supported machine, a hoe located upon opposite sides of the longitudinal center of the machine, automatically operated means for raising and lowering the hoes longitudinally of the machine at spaced intervals during the travel of the machine and means for moving the hoes laterally during their raising and lowering operation.

2. A cultivator embodying a wheel supported machine, a hoe located upon opposite sides of the longitudinal center of the machine, automatically operated means for raising and lowering the hoes longitudinally of the machine at spaced intervals during the travel of the machine, means for moving the hoes laterally during their longitudinally raising and lowering operation and means whereby the hoes will be alternately operated.

3. A cultivator embodying a wheel supported machine, a pivotally mounted spring actuated bearing located upon opposite sides of the longitudinal center of the machine, a hoe mounted in each of said bearings, automatically operated means for moving the bearings upon their pivots to raise and lower the hoe at spaced intervals during the travel of the machine and means for moving the hoes laterally during their raising and lowering operation.

4. A cultivator embodying a wheel supported machine, a pivotally mounted cylindrical bearing located upon each side of the longitudinal center of the machine, a hoe mounted in each of said bearings, means for rocking the bearings upon their pivots at spaced intervals during the travel of the machine to raise and lower the hoes and means for connecting the hoes to the frame whereby a lateral movement will be imparted to said hoes during their raising and lowering operation.

5. A cultivator embodying a wheel supported machine, a hoe located upon opposite sides of the longitudinal center of the machine, a notched disk rotatably mounted upon each side of the machine and engageable with the hoes for raising and lowering the latter at spaced intervals during the travel of the machine and means for moving the hoes laterally during their raising and lowering operation.

6. A cultivator embodying a wheel supported machine, a hoe located upon opposite sides of the longitudinal center of the machine, a cam rotatable upon each side of the machine and engageable with the hoes for raising and lowering the latter at spaced intervals during the travel of the machine, means whereby the cams may be adjusted to prevent simultaneous raising and lowering of the hoes and means for moving the hoes laterally during their raising and lowering operation.

7. A cultivator embodying a wheel supported machine, a hoe located upon opposite sides of the longitudinal center of the machine, automatically operated means for raising and lowering the hoes at spaced intervals during the travel of the machine, means for moving the hoes laterally during their raising and lowering operation and means for adjusting the hoe operating means to properly time their operation.

8. A cultivator embodying a wheel supported machine, a hoe located upon opposite sides of the longitudinal center of the machine, automatically operated means for raising and lowering the hoes at spaced intervals during the travel of the machine, means for moving the hoes laterally during their raising and lowering operation and an adjustable ratchet for regulating the hoe operating means to properly time their operation.

9. A cultivator embodying a wheel supported machine, a hoe located upon opposite sides of the longitudinal center of the machine, automatically operated cams for raising and lowering the hoes at spaced intervals during the travel of the machine, ratchet mechanism located between the cams for rotating the latter and means extending to within convenient reach of the operator for operating the ratchet mechanism to adjust the cams.

10. A cultivator embodying a wheel supported machine, a hoe located upon opposite sides of the longitudinal center of the machine, automatically operated means for raising and lowering the hoes at spaced intervals during the travel of the machine, links connecting the hoes with the machine for moving the hoes laterally during their raising and lowering operation and cultivator teeth located at the rear of the hoes.

In testimony whereof I affix my signature.

THOMAS M. HUGHES.